United States Patent
Dutta et al.

(10) Patent No.: US 7,099,834 B2
(45) Date of Patent: Aug. 29, 2006

(54) METHOD, SYSTEM, AND PROGRAM FOR TRANSFERRING DATA BETWEEN SERVERS THROUGH A CLIENT COMPUTER OVER A NETWORK

(75) Inventors: Rabindranath Dutta, Austin, TX (US); Kamal Chandrakant Patel, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 928 days.

(21) Appl. No.: 09/737,339

(22) Filed: Dec. 15, 2000

(65) Prior Publication Data

US 2002/0077933 A1  Jun. 20, 2002

(51) Int. Cl.
*G06F 17/60* (2006.01)

(52) U.S. Cl. ............................ 705/26; 705/27; 705/23; 709/23

(58) Field of Classification Search ............ 705/26–28, 705/20, 51, 23; 709/203, 23; 707/5; 713/201; G06F 17/60

See application file for complete search history.

(56) References Cited

U.S. PATENT DOCUMENTS

| | | | | |
|---|---|---|---|---|
| 657,040 | A | * | 8/1900 | St. John ...................... 199/42 |
| 5,475,585 | A | * | 12/1995 | Bush ........................... 705/26 |
| 5,631,827 | A | * | 5/1997 | Nicholls et al. ............... 705/28 |
| 5,793,972 | A | * | 8/1998 | Shane ......................... 709/219 |
| 5,802,334 | A | | 9/1998 | Nickolas et al. |
| 5,825,881 | A | * | 10/1998 | Colvin, Sr. ................... 705/78 |
| 5,913,214 | A | | 6/1999 | Madnick et al. |
| 5,970,475 | A | * | 10/1999 | Barnes et al. ................. 705/27 |
| 5,974,443 | A | | 10/1999 | Jeske |
| 5,983,262 | A | | 11/1999 | Kukkal |
| 6,003,067 | A | * | 12/1999 | Suzuki et al. ............... 709/204 |
| 6,016,494 | A | | 1/2000 | Isensee et al. |
| 6,017,157 | A | * | 1/2000 | Garfinkle et al. ........... 396/639 |
| 6,029,141 | A | | 2/2000 | Bezos et al. |
| 6,073,124 | A | * | 6/2000 | Krishnan et al. ............. 705/59 |
| 6,108,639 | A | * | 8/2000 | Walker et al. ................ 705/26 |
| 6,125,352 | A | * | 9/2000 | Franklin et al. .............. 705/26 |
| 6,134,548 | A | * | 10/2000 | Gottsman et al. ............. 707/5 |
| 6,154,738 | A | * | 11/2000 | Call ............................. 707/4 |

(Continued)

FOREIGN PATENT DOCUMENTS

| KR | 2002030634 A | * | 4/2002 |
|---|---|---|---|
| KR | 2004027854 A | * | 4/2004 |

OTHER PUBLICATIONS

Jacques Surveyer, The components of change—companies turn to prewritten software rather than code from scratch, InformationWeek, May 6, 1996, n 578, PGAD01 (Dialog(R) File 647, ACC. No. 01090268.*

(Continued)

*Primary Examiner*—Cuong Nguyen
(74) *Attorney, Agent, or Firm*—David W. Victor; Konrad Raynes & Victor LLP

(57) ABSTRACT

Provided is a method, system, and program for transferring data from a first server to a second server through a client computer over a network. The client performs downloading and displaying content in a first page from the first server and downloading and displaying content in a second page from the second server including transfer data to communicate to the first server. The client computer displays the transfer data with the content from the first page and communicates the transfer data to the first server.

14 Claims, 4 Drawing Sheets

U.S. PATENT DOCUMENTS

| | | | |
|---|---|---|---|
| 6,253,188 B1* | 6/2001 | Witek et al. | 705/14 |
| 6,279,112 B1* | 8/2001 | O'Toole et al. | 713/201 |
| 6,301,574 B1* | 10/2001 | Thomas et al. | 707/1 |
| 6,343,274 B1* | 1/2002 | McCollom et al. | 705/26 |
| 6,344,853 B1* | 2/2002 | Knight | 345/629 |
| 6,400,996 B1* | 6/2002 | Hoffberg et al. | 700/83 |
| 6,418,424 B1* | 7/2002 | Hoffberg et al. | 706/21 |
| 6,418,441 B1* | 7/2002 | Call | 707/10 |
| 6,484,149 B1* | 11/2002 | Jammes et al. | 705/26 |
| 6,512,570 B1* | 1/2003 | Garfinkle et al. | 355/40 |
| 6,512,919 B1* | 1/2003 | Ogasawara | 455/422.1 |
| 6,587,127 B1* | 7/2003 | Leeke et al. | 715/765 |
| 6,601,234 B1* | 7/2003 | Bowman-Amuah | 717/108 |
| 6,636,242 B1* | 10/2003 | Bowman-Amuah | 715/764 |
| 6,640,145 B1* | 10/2003 | Hoffberg et al. | 700/83 |
| 6,724,403 B1* | 4/2004 | Santoro et al. | 715/765 |
| 6,789,073 B1* | 9/2004 | Lunenfeld | 707/3 |
| 6,801,225 B1* | 10/2004 | Gould | 715/761 |
| 6,850,252 B1* | 2/2005 | Hoffberg | 715/716 |
| 6,920,606 B1* | 7/2005 | Jablonski et al. | 715/501.1 |
| 2002/0010623 A1* | 1/2002 | McCollom et al. | 705/14 |
| 2002/0065728 A1* | 5/2002 | Ogasawara | 705/23 |
| 2002/0151992 A1* | 10/2002 | Hoffbert et al. | |
| 2003/0028451 A1* | 2/2003 | Ananian | |
| 2003/0058277 A1* | 3/2003 | Bowman-Amuah | 345/765 |
| 2004/0083165 A1* | 4/2004 | Lawrence | |
| 2004/0133508 A1* | 7/2004 | Lawrence | |
| 2004/0143446 A1* | 7/2004 | Lawrence | |

OTHER PUBLICATIONS

Microsoft Corporation, How to write and use ActiveX Controls for Microsoft Windows . . . ,Jun. 1999, from http://msdn.microsoft.com total 7 pages.*

FlexiInternational, Flexi web strategy targets ActiveX first, Java maybe, Sep. 27, 1996, total 2 pages from http://www.findarticles.com.*

McKie, Internet-DBMS Strategies, DBMS Oct. 1996, total 7 pages from http://www.dbmsmag.com/9610d13.html.*

Unknown author, Yokogawa's DAQStation offers digital data collection, ENT, 5, 10, 34, Jun. 14, 2000 (from Dialog(R) File 47, acc. No. 05848549).*

Microsoft Corp., "Chapter 24—ActiveX" [online], 2001, pp. 1-6, [Retrieved on Nov. 26, 2001]. Retrieved from the Internet at <URL: http://www.microsoft.com/TechNet/archive/ie/reskit/ie4/Part6/part6b.asp?frame=true>.

ZDNet Developer, "ActiveX 101" [online], Sep. 29, 1997, pp. 1-2, [Retrieved on Nov. 26, 2001]. Retrieved from the Internet at <URL: http://www.zdnet.com/devhead/stories/articles/0,4413,2142556,00.html>.

Microsoft Corp., "Microsoft ActiveX Controls Overview" [online], Oct. 23, 1998, pp. 1-2, [Retrieved on Nov. 26, 2001]. Retrieved from the Internet at <URL: http://msdn.microsoft.com/library/en-us/dnaxctrl/html/msdn_actxcont.asp?frame=true>.

U.S. Appl. No. 09/225,955, filed on Jan. 6, 1999, entitled, "Frame-Based Web Browser", invented by Neelakantan Sundaresan and Nandini Sharma.

* cited by examiner

METHOD, SYSTEM, AND PROGRAM FOR TRANSFERRING DATA BETWEEN SERVERS THROUGH A CLIENT COMPUTER OVER A NETWORK

BACKGROUND OF THE INVENTION

1. Field of the Invention

The present invention relates to a method, system, and program for transferring data between servers through a client computer over a network.

2. Description of the Related Art

Today, consumers may purchase numerous products, services, and financial instruments, e.g., stocks, bonds, indexes, options, etc., using an Internet web browser, e.g., NETSCAPE Communicator, the MICROSOFT Internet Explorer, etc.** Consumers also use various search engine services available on the Internet that locate different sales agents for a product to allow price comparisons. One disadvantage of purchasing products on-line over the Internet is that the buyer is not assured that the price is fair. For instance, if a consumer is using a web browser to purchase stock from an on-line brokerage over the Internet, the consumer may be concerned that the price the brokerage is displaying or selling to the consumer is not the current price of the stock. To find the current price when the transaction occurs, the consumer would have to access the centralized exchange to determine the real-time price when the transaction, e.g., sale or purchase, was executed.

NETSCAPE is a registered trademark of the Netscape Communications Corporation; WINDOWS, MICROSOFT, and ACTIVEX are registered trademarks of Microsoft Corporation; JAVA is a trademark of Sun Microsystems, Inc.

Recently, the Chairman of the Securities and Exchange Commission (SEC) Arthur Levitt expressed concern that investors may not be getting the best prices when trading securities online over the Internet. Mr. Levitt said that a central exchange that could inform consumers of current prices would help alleviate unfair pricing concerns.

A similar concern arises in the context of purchasing airline tickets on-line from an on-line travel agent. Again, consumers may be concerned whether the price they are getting is "fair" or the best price they can get in the context of the price set by the airline carrier. Moreover, when purchasing very expensive products, such as jewelry, an automobile, etc., the consumer may be concerned whether the price they are being charged from the on-line agent selling the product is "fair" or the best they can do.

Such consumer uncertainty over the fairness of the "price" being charged may discourage on-line purchases.

For these reasons, there is a need to provide mechanisms to make consumers confident about the fairness of the price they are being charged for a product.

SUMMARY OF THE PREFERRED EMBODIMENTS

Provided is a method, system, and program for transferring data from a first server to a second server through a client computer over a network The client performs downloading and displaying content in a first page from the first server and downloading and displaying content in a second page from the second server including transfer data to communicate to the first server. The client computer displays the transfer data with the content from the first page and communicates the transfer data to the first server.

In further implementations, a first program is activated in response to processing the first page. User input selection is received to access the transfer data with the first program. The first program issues a request to download and display the content from the second server including the transfer data. A second program is activated in response to processing the second page. The second program communicates the transfer data to the first program and the first program displays the transfer data with the content from the first page.

In certain electronic commerce implementations, the network comprises the Internet, the first server is used by a sales agent to allow a consumer at the client computer to purchase a product over the Internet, and the second server is maintained by a source originating the product and providing a price for the product to be used by the sales agent. In such case, the transfer data comprises price data for the product and the sales agent uses the price data communicated to the first server to determine a price to charge the consumer for the product.

The described implementations provide a technique to allow data displayed at a client computer from different servers to be transferred from one server to another through the client computer, wherein the data being transferred is displayed at the client computer to allow a user of the client computer to view the data being transferred. Such implementations may be used in electronic commerce environments where price data needs to be communicated from a source of a product, e.g., a manufacturer (e.g., consumer product manufacturer), security trading exchange (e.g., the NASDAQ, NYSE, etc.), service provider (e.g., Airline carrier, etc.), etc., to a sales agent to use as the price to charge a consumer. In the described implementations, the consumer is allowed to view an authenticated price from the product source before the price is transferred to the sales agent server to use as the price to charge the client for the product.

BRIEF DESCRIPTION OF THE DRAWINGS

Referring now to the drawings in which like reference numbers represents corresponding parts throughout.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Figure 1:
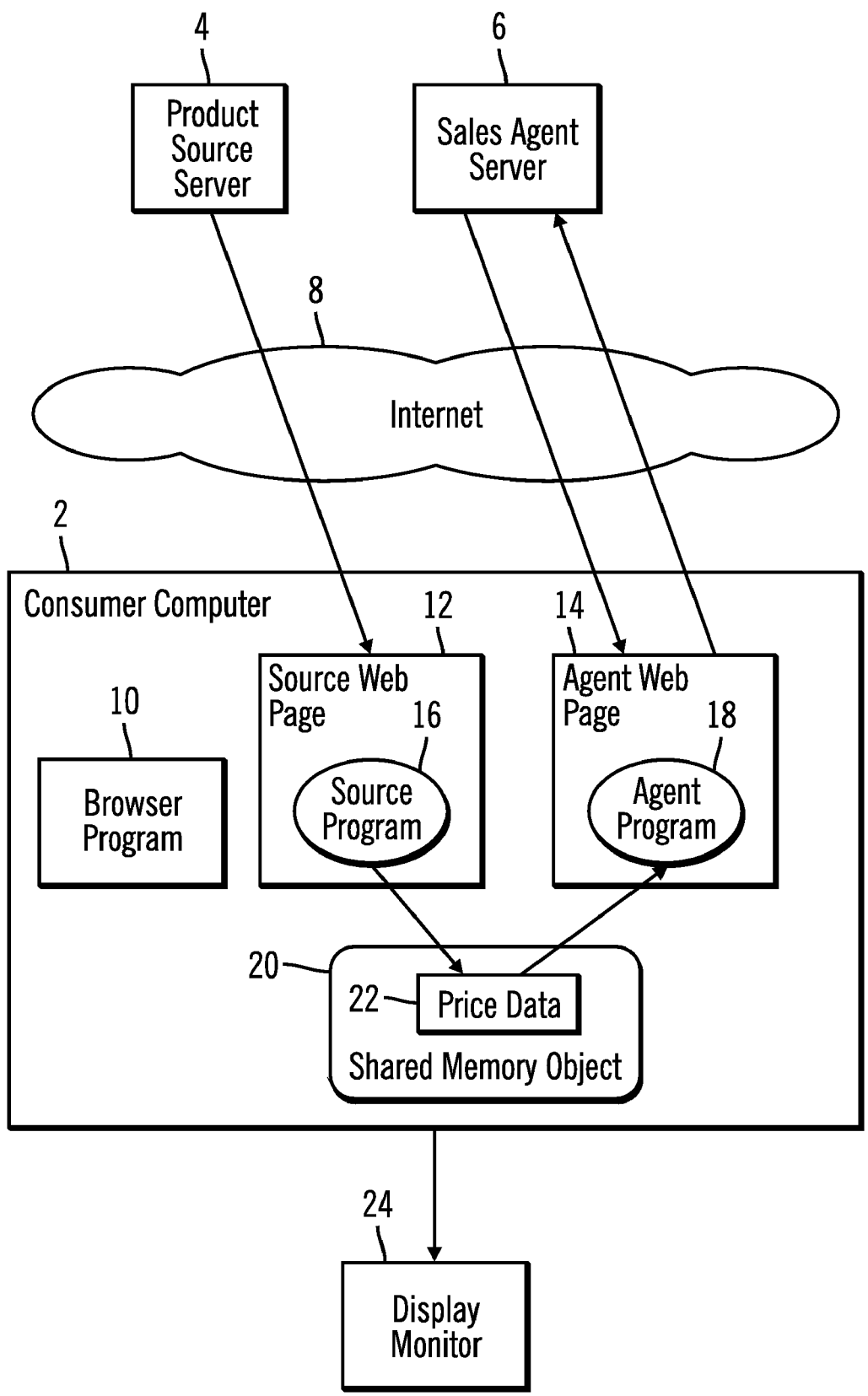
FIG. 1 illustrates a network computing environment implementation of preferred embodiments.

FIG. 1 illustrates a network computing environment in which preferred embodiments are implemented. A consumer computer 2 communicates with a product source server 4 and sales agent server 6. The product source comprises the manufacturer or originator of the product or service being purchased. For instance, in the case of securities, the product source comprises the exchange where the security is traded; for airline tickets, the product source comprises the airline carrier; for consumer products, the source comprises the product manufacturer, etc. The sales agent is the entity that sells retail to consumers the product produced or provided by the product source. The consumer computer 2 communicates with the product source server 4 and sales agent server 6 over the Internet 8 in a manner known in the art. The sales agent server 6 allows on-line purchases over the Internet 8 at the server 6. The consumer computer 2 may comprise any computing device known in the art, such as a personal computer, laptop computer, hand held computer, server, cellular phone, telephony device, network appliance, etc. The servers 4 and 6 are computers that may be especially suited for serving data over the Internet 8, such as one or more server class machines.

The consumer computer 2 would execute in memory (not shown) a browser program 10, such as the Netscape Communicator or Microsoft Explorer browser program. The user would manipulate the browser program 10 graphical user interface (GUI) to download a source web page 12 from the product source server 4 and an agent web page 14 from the sales agent server 6, wherein each page 12 and 14 includes code capable of being rendered by the browser program 10, e.g., HTML, extensible markup language (XML), Dynamic HTML (DHTML), etc. The source web page 12 includes a current price of the product as set or determined by the product source of the product or service the consumer is purchasing through the sales agent server 6. The source web page 12 includes code to activate a source program 16 to write the current price data 22 to a shared memory object 20 in a memory region of the consumer computer 2.

The agent web page 14 includes code to activate the agent program 18 to read the current price data 22 written to the shared memory object 20 and display the price data 22 to show that the sales agent intends to use the price as presented by the product source in computing the cost to the consumer.

In the described implementations, the source 16 and agent 18 programs are activated through the browser program 10. Thus, the source 16 and agent 18 programs may be implemented using browser compatible programming architectures known in the art, such as the Microsoft ActiveX controls, Java Applets, JavaBeans, etc. In such case, the source 12 and agent 14 pages include code to activate the source 16 and agent 18 programs to perform the operations described herein. For instance, if the source web page 12 comprises a Hypertext Markup Language (HTML) page, then the HTML object element is used to add ActiveX controls to the source web page 12. The HTML object element includes a set of PARAM elements that specify which data the control should use and to control the appearance and behavior of the control. For the source web page 12, the PARAM element may comprise the current price information, such as the price per unit of the product the consumer wants as well as a time stamp for the price, and an address of the shared memory object 20 in the consumer computer 2 memory. Note that in the case of Java implementations, the Java source 16 and agent 18 programs may be downloaded from the product source server 4 and sales agent server 6, respectively, and executed from the browser program 10, which in such embodiments is a Java enabled machine. In the case where the source 16 and agent 18 programs are implemented as ActiveX controls, the ActiveX controls may be stored locally on the consumer computer 2 and activated through code in the web pages 12, 14**, such as the HTML object element.

Figure 2:
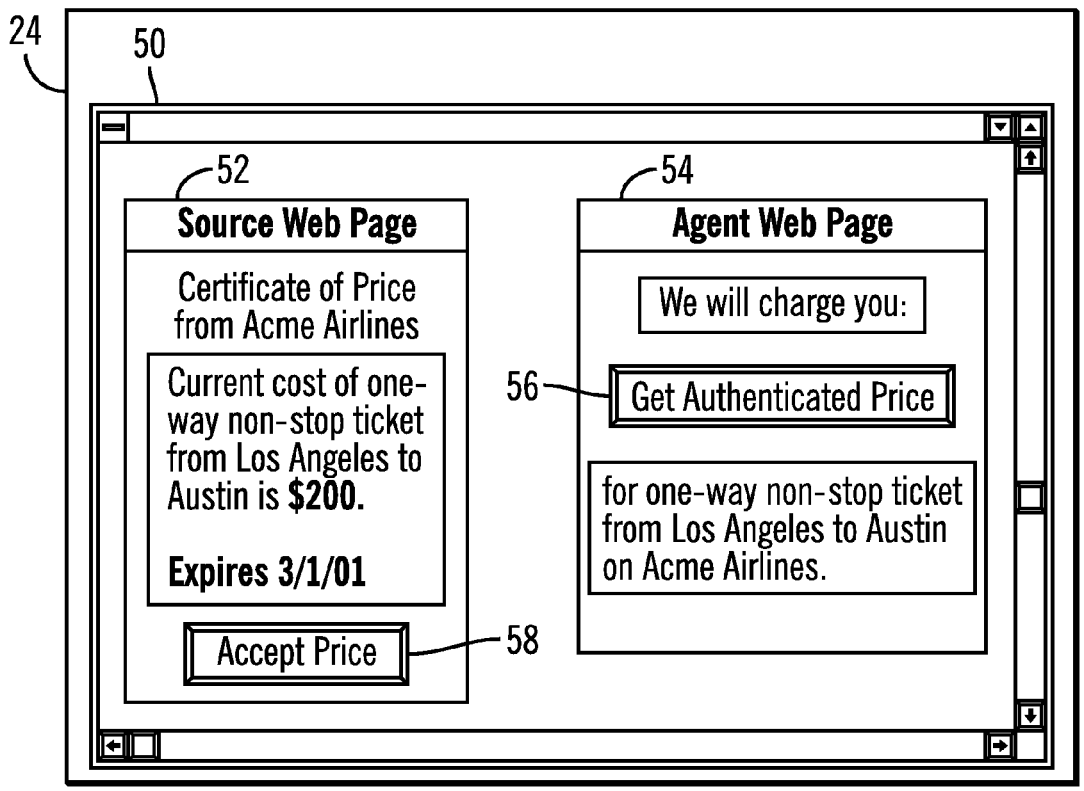
FIGS. 2 and 3 illustrate web pages displayed in certain implementations.

FIG. 2 illustrates an example of how the browser program 10 may output the content of the source web page 12 and agent web page 14 on a computer display monitor 24 (FIG. 1) attached to the consumer computer 2. In the example, the product is an airline ticket from the carrier Acme airlines for a one-way trip from Los Angeles, Calif. to Austin, Tex. The consumer computer 2 would include a video adaptor to control the display monitor 24 in a manner known in the art. The consumer computer 2 operating system (not shown) displays a general desktop window 50 and the browser program 10 displays a browser window 52 displaying the content of the source web page 12 and a browser window 54 for displaying the content of the agent web page 14. A "Get Authenticated Price" push button 56 is displayed in the browser window 54, which triggers code that submits a request to a Universal Resource Locator (URL) address, e.g., an Hypertext Transfer Protocol (HTTP) GET request, from which to obtain the price from the product source server 4. In response to selection of the push button 56, the source web page 12 is downloaded from the product source server 4 and displayed in the browser window 52. The price for the product selected in the agent web page 14 is displayed, which is shown as "$200". In certain implementations, the content of the source web page 52 comprises a digital certificate provided from a certificate authority, e.g., VeriSign Inc., that authenticates that the price displayed in the browser window 52 is from the product source server 4 in a manner known in the art. Using a digital certificate to communicate the price to the consumer computer 2 assures the customer as to the authenticity of the price.

Figure 3:
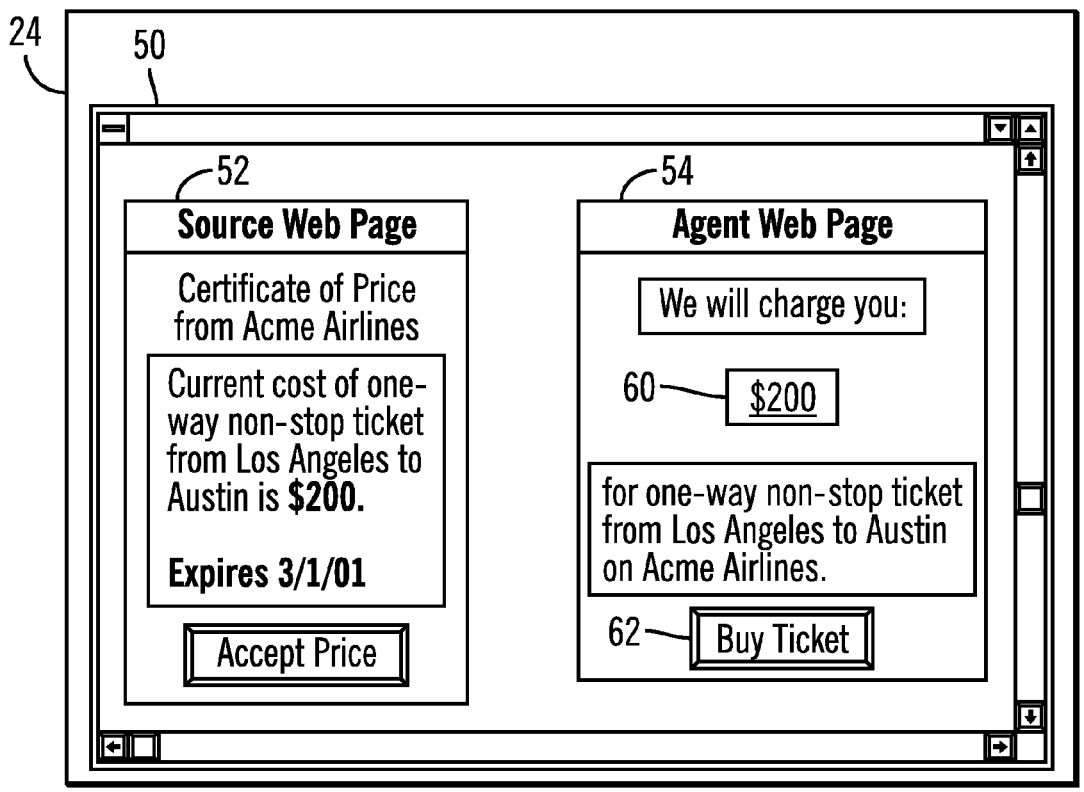

In FIG. 2, if the user selects the "Accept Price" button 58 in the browser window 52, then the price displayed in the browser window 52 is communicated to the browser window 54 to display the price that the agent will apply to the consumer as shown in FIG. 3, where the "Get Authenticated Price" button 56 is replaced with the price 60 provided in the certificate displayed in browser window 52. The consumer can then purchase the ticket by selecting the "Buy Ticket" push button 62.

In the example of FIGS. 2 and 3, both browser windows 52 and 54 are shown as displayed at the same time. The browser windows 52 and/or 54 may comprise a pop-up browser window and/or a browser window including all the menu items displayed. Still further, selection of one browser window 52 or 54 may cause the selected browser to be displayed over the other browser window, thereby requiring the consumer to toggle between browser windows. In alternative implementations, the content of the source web page 12 and agent web page 14 may be displayed concurrently in different frames or display areas of the same browser window using HTML frames technology.

Figure 4:
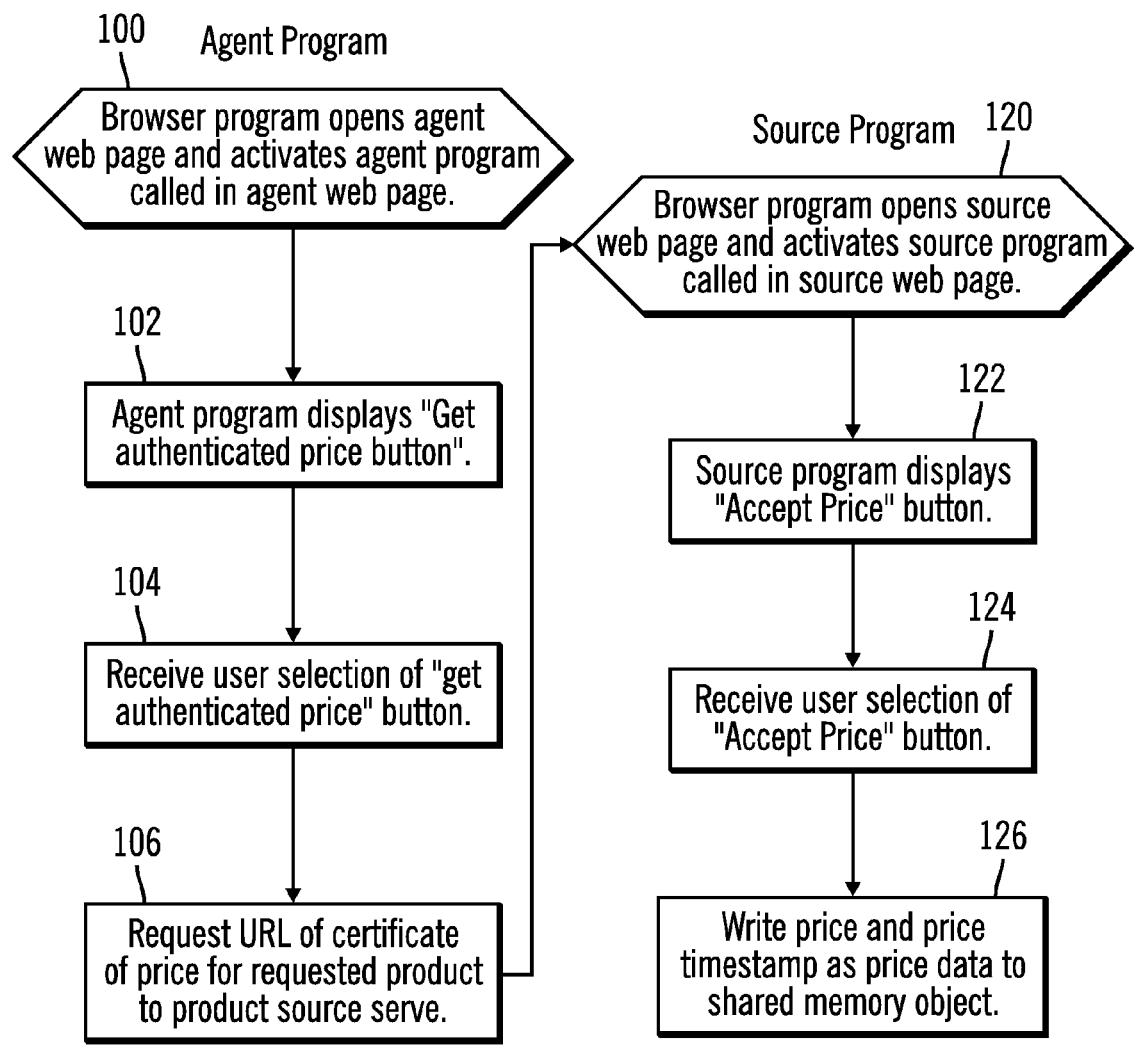
FIGS. 4 and 5 illustrate logic implemented in programs to display and transfer data in certain implementations.

FIG. 4 illustrates the logic implemented in the agent 18 and source 16 programs. Control begins at block 100 with the browser program 10 opening the agent web page 14 in the browser window 54 and activating the agent program 18 called from the agent web page 14. The agent program 18 displays (at block 102) the "Get Authenticated Price" button 56 (FIG. 2). Upon receiving (at block 104) user selection of the "Get Authenticated Price" button 56, the agent program 18 submits a request, e.g., an HTTP GET request, to the URL for the certificate of the price for the requested product at the product source server 4. At block 120, the browser program 10 opens a new browser window 52 to display the content of the source web page 12 and activate the source program 16 called in the source web page 12. The source program 16 displays (at block 122) the "Accept Price" button 58. In response to the user selecting (at block 124) the "Accept Price" button 58, the source program 16 writes (at block 126) the price data 22, including the price per unit and price timestamp, to the shared memory object 20.

Figure 5:
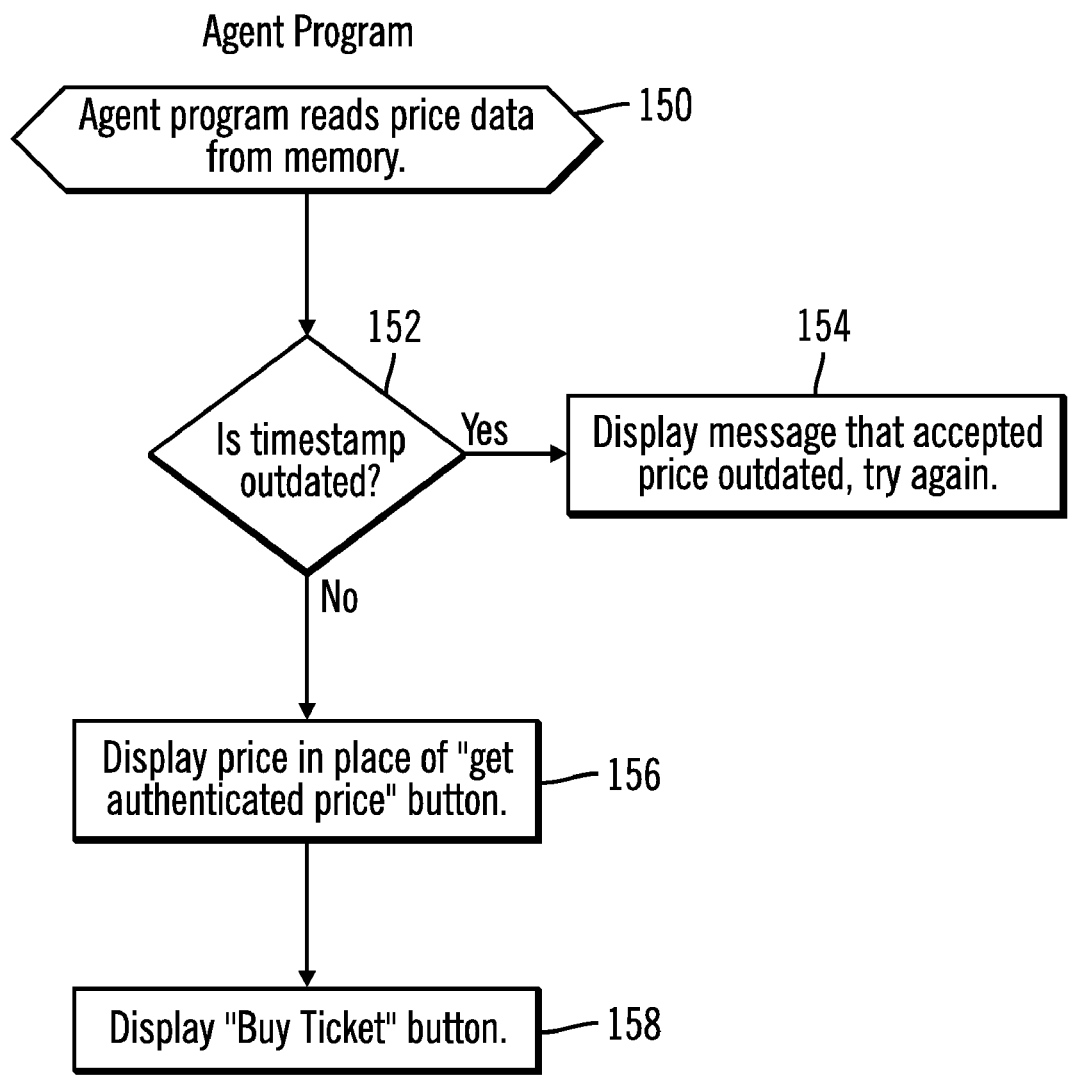

With reference to FIG. 5, at block 150, the agent program 18 reads the price data 22 from the shared memory object 20. The agent program 18 may be signaled after the price data 22 is written to the shared memory object 20 by the consumer computer 2 operating system or signaled directly by the source program 16 after completing the write operation in a manner known in the art. Alternatively, the agent program 18 may periodically query the shared memory object 20 to determine if there is new price data 22. After reading the price data 22, the agent program 18 determines (at block 152) whether the timestamp provided with the price data 22 is outdated. The time duration of the price data 22 differs by product. For instance, the time stamp for a price of a share of stock during trading hours may expire rather quickly, whereas the price data for an airline ticket or consumer product may remain valid for a longer period of time. If (at block 152) the time stamp is outdated (at block 154), then an error message is displayed on the display monitor 24 notifying the user of the consumer computer 2 that the price displayed in the browser window 52 is no longer valid. In such case, the consumer would have to again select the "Get Authenticated Price" button 56. If the time stamp is not outdated, then the agent program 18 displays (at block 156) the price in the price data 22 in the browser 54 at the location 60 (FIG. 3) where the in the "Get Authenticated Price" button was previously displayed. The agent program 18 further displays (at block 158) the "Buy Ticket" button 62 to allow the consumer to purchase the ticket at the indicated price. Before the purchase completes, the time stamp may be checked again to determine whether the price from the certificate has expired since the price was displayed at location 60 in the browser window 54. When the consumer selects the "Buy Ticket" button 62, the price communicated from the window 52 would be transferred to the sales agent server 6 to use to complete the transaction and determine the price to charge the consumer.

With the above described implementation, consumers obtain an authenticated price quote from the source of the product or service being purchased that is then used directly to determine the price the sales agent charges the consumer. This implementation facilitates Internet commerce because the consumer can immediately engage in the online transaction and be assured that the price they are being quoted is a "fair" price set by the source or manufacturer of the product.

Following are some alternative implementations.

The preferred embodiments may be implemented as a method, apparatus or program using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, firmware, programmable logic, memory devices (e.g., EEPROMs, ROMs, PROMs, RAMs, SRAMs, etc.), hardware, electronic devices, a readable storage diskette, CD-ROM, a file server providing access to the programs via a network transmission line, wireless transmission media, signals propagating through space, radio waves, infrared signals, etc. Of course, those skilled in the art will recognize that many modifications may be made to this configuration without departing from the scope of the present invention.

In the described implementations, the information downloaded from one server comprised price information displayed in a user interface window that is transferred to another program displaying content in another user interface window. In alternative implementations, the servers 4 and 6 may not be involved in commercial transactions and the information communicated from one program to another through the consumer computer may not comprise price information. For instance, the computer 2 may display user interface windows including content from databases and/or applications in two different servers, where data displayed in one of the windows from one of the servers is communicated to the other server.

In the described implementations, the systems 2, 4, and 6 communicated over the Internet 8. In alternative implementations, the systems 2, 4, and 6 may communicate over networks other than the Internet, such as a local area network (LAN), Intranet, USENET, etc.

In the described implementations, the price information communicated to the consumer computer 2 was authenticated using a trusted certificate authority. Alternatively, the price information may not be certified and may be communicated in an uncertified manner from the product source server 4 to the consumer computer 2.

In the described implementations, the content of the source 12 and agent 14 web pages were displayed using a browser program 10 known in the art. In alternative implementations, the source 16 and agent 18 programs may utilize user interface mechanisms other than a browser window to display the content of the source 12 and agent 14 web pages. In such case, the windows 52 and 54 may be implemented using user interface technology other than a browser program that is capable of downloading and displaying the content of pages from over a network such as the Internet. For instance, the agent program may download the price certificate from the product source server 4 and display the price data in a user interface window that is not a browser generated window.

In the described implementations, the price was transferred from the digital certificate displayed in the window 52 to the window 54 through a shared memory object 20. However, those skilled in the art will recognize that many other techniques may be used to allow one application program to communicate data, such as price data, to another executing application that do not involve shared memory.

In the described implementation, a separate agent program accessed the price data and updated the browser 54 to display the price data. In alternative implementations, the functions performed by the source 12 and agent 14 programs may be implemented in a single program activated by code from the agent web page 14. Alternatively, the source 12 and agent 14 programs may comprise one or more programs, methods, functions, or routines that perform the operations described herein as source and agent program functions.

In the described implementations, the consumer caused the price data to be communicated to the window 54 using the "Accept Price" button 58 (FIG. 2). In alternative implementations, different graphical mechanisms may be used to allow the user to cause the transfer of the price from the certificate displayed in window 52 to window 54 used by the agent. For instance, the source program 16 may display a graphical icon which the user could drag-and-drop to the window 54 to cause the price data 22 to be communicated to the agent program 18 and window 54. Still further, the price data 22 displayed in the certificate window 52 may automatically be communicated to the agent program 18 without requiring user intervention.

In the described implementations, the price data is communicated to the agent locally through the resources of the consumer computer 2. In alternative implementations, the source program 16 may issue a request over the Internet 8 to the sales agent server 6 providing the price data 22 and, in response, the sales agent server 6 would assemble a new agent web page with the price data 22 from the product source server 4 to transfer to the consumer computer 2 over the Internet 8 to display to the user.

In the described implementations, the content in the source 12 and agent 14 pages conforms to the HTML file format. However, alternative file formats for interchanging documents of networks may be used, such as Dynamic Hypertext Mark-Up Language (DHTML), the Extensible Markup Language (XML), Cascading Style Sheets, any other Standard Generalized Markup Language (SGML), Scalable Vector Graphics (SVG), or any other language known in the art for creating interchangeable, structured documents. Further, any version of HTML may be used, including version 2.0, 3.2, 4.0, etc. In yet further embodiments, the requested file may be in any other file format, i.e., other than an SGML type format, capable of being displayed or otherwise downloaded and displayed in the browser application.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for transferring authenticated price data from a first server to a second server through a client computer over a network, wherein the client computer performs:
   downloading and displaying first content in a first page from the first server;
   downloading a program;
   downloading and displaying second content in a second page from the second server including transfer authenticated price data to communicate to the first server;
   activating, by the first page, the program to cause a display of the transfer authenticated price data with the content from the first page; and
   enabling, by the program, communication of the transfer authenticated price data to the first server.

2. The method of claim 1, wherein communicating the transfer authenticated price data to the first server comprises:
   writing the transfer authenticated price data to a memory location in the client computer; and
   reading the transfer authenticated price data from the memory location, wherein the read transfer authenticated price data is displayed with the first content from the first page.

3. The method of claim 1, wherein the program comprises a first program, further comprising:
   receiving user input selection to access the transfer authenticated price data with the first program, wherein the first program issues a request to download and display the second content from the second server including the transfer authenticated price data; and
   activating a second program in response to processing the second page, wherein the second program communicates the transfer authenticated price data to the first program.

4. The method of claim 3, further comprising:
   receiving user input selection to cause the second program to communicate the transfer authenticated price data to the first program.

5. The method of claim 4, wherein the transfer authenticated price data is communicated to the first program by:
   writing, with the second program, the transfer authenticated price data to a memory location in the client; and
   reading, with the first program, the memory location to access the transfer authenticated price data.

6. The method of claim 3, wherein the first and second pages include code to activate the first and second programs, respectively.

7. A system in communication with a first server and a second server, comprising:
   a first program executed to perform operations, the operations comprising:
      (i) displaying content in a first page downloaded from the first server; and
      (ii) displaying a second page downloaded from the second server including transfer authenticated price data; and
   a second program downloaded from the first server to cause operations to be performed, the operations comprising:
      (i) accessing the transfer authenticated price data included in the second page;
      (ii) displaying the transfer authenticated price data with the content from the first page; and
      (iii) transferring the transfer authenticated price data to the first server.

8. The system of claim 7, further comprising:
   a memory location, wherein the transfer authenticated price data is written to the memory location, and wherein the second program reads the transfer authenticated price data from the memory location to transfer to the first server.

9. A system for transferring authenticated price data from a first server through a client computer comprising:
   a second server;
   a network interface allowing the second server to communicate with the client computer;
   program logic implemented in a computer readable memory capable of causing the second server to perform:
      (i) in response to a request, transmitting a first page and a program to the client computer, wherein the first page activates the program in the client computer to cause the client computer to transmit transfer authenticated price data to the second server, wherein the client computer accesses the transfer authenticated price data from a second page the client computer downloads and displays from the first server, and wherein the program further causes the client computer to display the transfer authenticated price data from the second page with content from the first page; and
      (ii) receiving the transfer authenticated price data from the client computer.

10. The system of claim 9, wherein the transfer authenticated price data is written to a memory location in the client computer, and wherein the program activated in the client computer reads the transfer authenticated price data from the memory location.

11. The system of claim 9, wherein the activated program, in response to user input at the client computer, issues a request to download and display the second page from the first server including the transfer authenticated price data, wherein the program displays the transfer authenticated price data with the content from the first page.

12. A computer readable medium including a program and a first page including content and code to activate the program, wherein the first page and the program are transferred to a client computer from a first server, wherein the client computer is further capable of communicating with a second server, and wherein the first page and the program cause the client computer to perform:

displaying the content in the first page; and activating, by the first page, the program to cause the client computer to transmit transfer authenticated price data to the first server, wherein the program causes the client computer to access the transfer authenticated price data from a second page the client computer downloads and displays from the second server, and wherein the program further causes the client computer to display the transfer authenticated price data from the second page with the content from the first page.

13. The computer readable medium of claim 12, wherein the transfer authenticated price data is written from the second page to a memory location in the client computer, and wherein the program is further capable of causing the client computer to read the transfer authenticated price data from the memory location.

14. The computer readable medium of claim 12, wherein the activated program, in response to user input at the client computer, issues a request to download the second page from the second server including the transfer price data, wherein the program displays the transfer authenticated price data from the second page.

* * * * *